United States Patent [19]

Krebs et al.

[11] 4,279,173
[45] Jul. 21, 1981

[54] BACKLASH FREE ADJUSTING MECHANISM

[75] Inventors: Fred G. Krebs, Rochester; Daniel B. Abbott, Farmington Hills, both of Mich.

[73] Assignee: Burroughs Corporation, Detroit, Mich.

[21] Appl. No.: 9,347

[22] Filed: Feb. 5, 1979

[51] Int. Cl.³ ............................................. F16H 55/18
[52] U.S. Cl. ......................................... 74/441; 74/409
[58] Field of Search ......................... 74/409, 441, 440; 10/86 A; 409/146; 350/77, 86, 225

[56] References Cited

U.S. PATENT DOCUMENTS

| 525,771 | 9/1894 | Parks | 74/441 |
|---|---|---|---|
| 525,780 | 9/1894 | Boyuton | 74/441 |
| 2,161,052 | 6/1939 | Hulshizer | 74/441 |
| 2,252,796 | 8/1941 | Whittell | 74/441 |
| 2,385,194 | 9/1945 | Carroll | 74/441 |
| 2,586,044 | 2/1952 | Horsky | 74/409 X |
| 2,615,348 | 10/1952 | Gasser | 74/441 |
| 2,679,168 | 5/1954 | Rokos | 74/441 |
| 2,857,778 | 10/1958 | Rokos | 74/441 |

Primary Examiner—Leslie Braun
Assistant Examiner—Conrad Berman
Attorney, Agent, or Firm—Carl Fissell, Jr.; Charles E. Quarton; K. R. Peterson

[57] ABSTRACT

A zero clearance, backlash free, adjusting mechanism wherein a multithreaded helical member is constrained against movement within a movable support by means of oppositely disposed concentric threaded members separated by a concentric torsion spring. Opposite ends of the torsion spring are captivated by respective opposite concentric members. One of said members being fixidly, slidably mounted within said movable support. Rotation of the helical member forces the two concentric members apart along the helix forcing the members into a zero clearance position effective to prevent any wobble or yawing movement of the helix and thus eliminating any backlash along the helical member. A U-shaped clip surrounds the movable support so as to retain the assembly effective to prevent accidental dislodgement or movement of the concentric members.

10 Claims, 5 Drawing Figures

U.S. Patent    Jul. 21, 1981    4,279,173
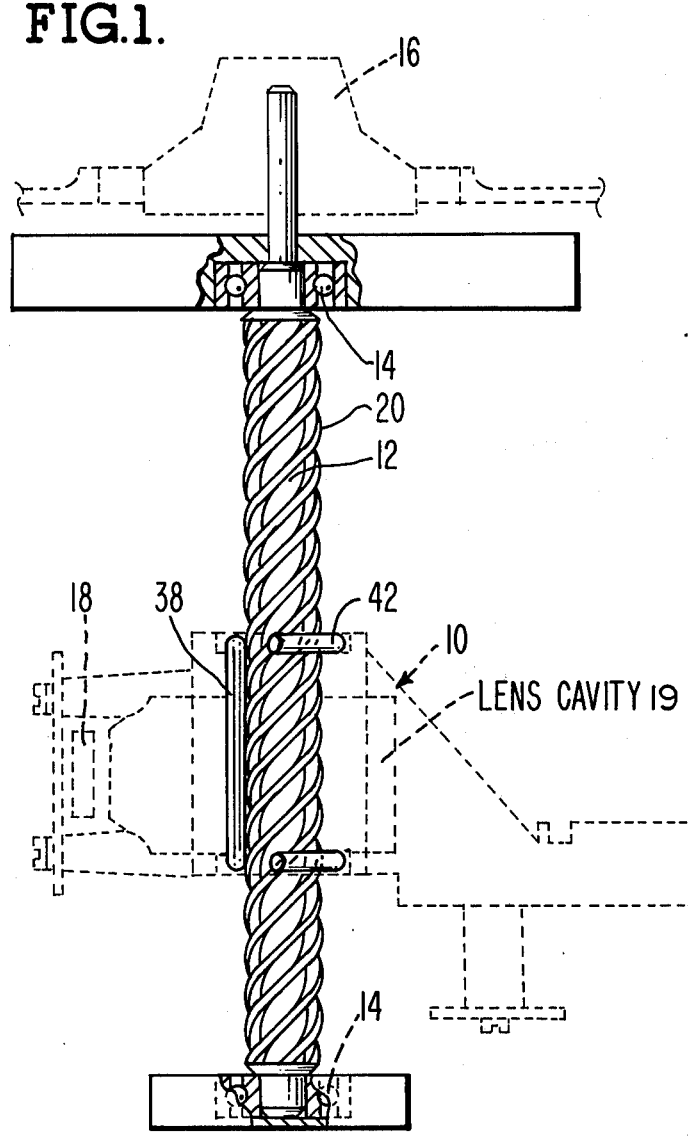
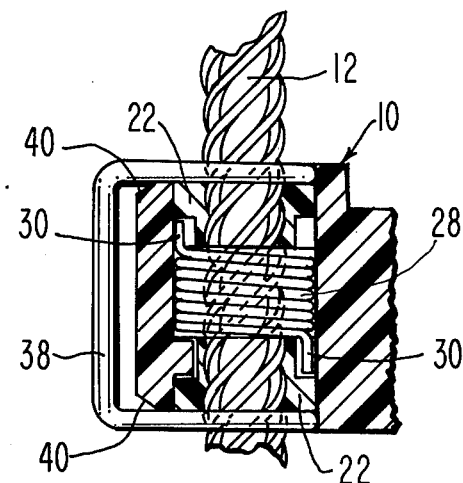
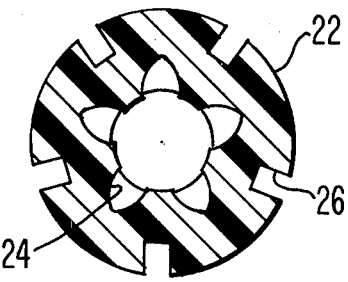
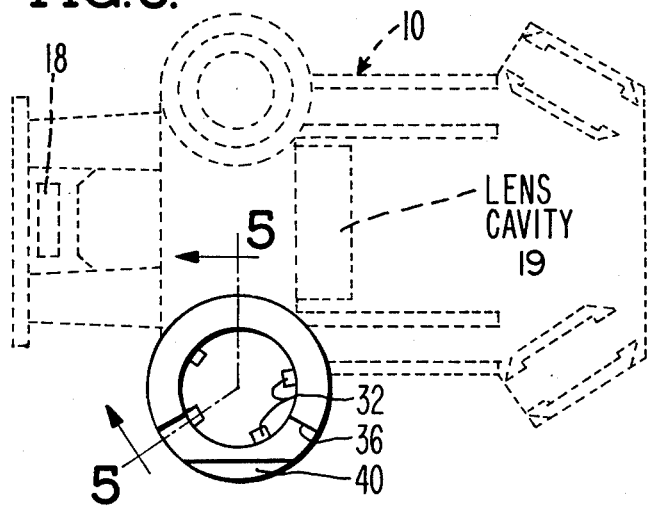
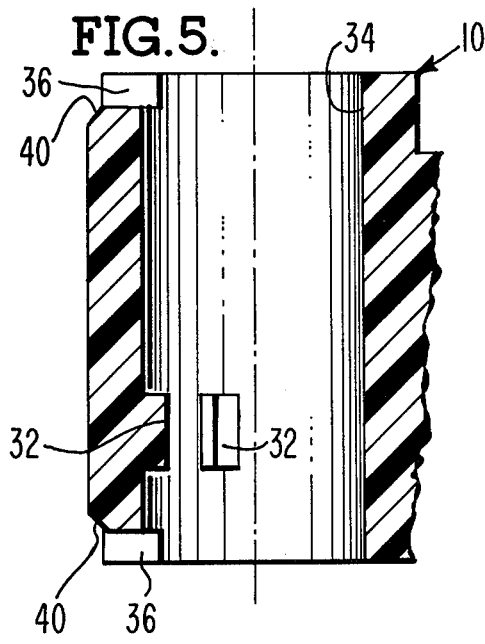

BACKLASH FREE ADJUSTING MECHANISM

BACKGROUND OF THE INVENTION

The present invention relates to backlash prevention with respect to movable or adjustable shaft members and has application to those devices wherein a low cost backlash-free adjusting or lead screw arrangement is necessary or required and to means for preventing any wobble, yaw or backlash thrust along the length of the adjusting member.

DESCRIPTION OF THE PRIOR ART

In mechanics or machinery the term "backlash" is described as the jarring reaction or striking back caused in badly fitting machinery by irregularities in velocity or a reverse of motion. Also, the distance or clearance through which one part of connected machinery, as a gear, pin, or screw, can be moved without moving the connected parts, resulting from looseness in fitting or from wear; hence, the play or movement permitted by this clearance. Backlash is also defined as the lost motion between two elements of a mechanism, i.e., the amount the first has to move, owing to imperfect connection, before communicating its motion to the second.

Many types of apparatus utilize parts which are interconnected by relatively loose fitting elements. In many types of equipment such looseness of fit can be tolerated since adjustment may rarely be required or such adjustment can be accomplished with relative ease. Also, in such apparatus the output or response desired or required is not related to or dependent upon the tolerance of the parts. In other types of apparatus, particularly those wherein measurement, force, linearity and micromovement are involved, relatively small errors in tolerance, looseness of fit etc., may not be tolerated.

In some types of apparatus, however, such, for example, as photographic devices, there is no room for error and any looseness of fit or backlash in parts destroys the resulting image or product.

In modern day reader/sorter apparatus wherein the centerline location of the lens system of the OCR (Optical Character Recognition) reader relative to the item or document being read is of significant importance, it is essential that the adjustment of the reader optics be accurate and completely "backlash-free", otherwise the optical pickup will be unable to function with the desired effectiveness or efficiency. Also, since the modern reader optical assembly must remain in accurate focus and the centerline location must be adjustable and accurately located over a relatively large range or area of movement (3.2 inches) it is essential that such movement be linear and without wobble, or lost motion which would destroy the angular relationship between the photo receptors and the data being observed condition. Thus, absence of backlash is a common requirement in such equipment.

SUMMARY OF THE INVENTION

It is an object of the present invention to solve these and other associated problems in a new, novel, and heretofore unobvious manner by providing a zero clearance, completely backlash free adjusting mechanism.

Another important object of the present invention is the provision of a backlash-free adjusting mechanism that maintains its initial adjustment regardless of wear and/or thermal expansion.

It is also an object of the present invention to provide a backlash-free adjusting mechanism in an optical system used with optical character recognition systems wherein the optical pickup (of characters) can be accomplished over a wide range of pickup area without destroying the pre-focused condition of the optical system relative to that area.

The present invention comprises a helical lead or adjusting screw disposed within a member to be moved relative thereto and with respect to an object upon which the lens system of the optics is focused and from which the optical system is enabled to pick up information. Oppositely disposed threaded concentric nut members loosely supported on the helix separated by a torsion spring are arranged along the helix of the lead screw in such manner that one end of the torsion spring is captivated in one of the nuts while the opposite end of the torsion spring is captivated in the opposite nut. One of the nuts is demountably, fixedly secured within the member to be moved in such manner that rotation of the nut is prevented. In order to set up and preadjust the backlash-free mechanism rotation of the helical member rotates the free nut captivating the opposite bent end of the torsion spring which forces the free nut to rotate with respect to the fixed nut. Stated another way, the free end of the torsion spring appropriately pre-loaded rotates the free nut and the helical member to reduce the backlash, if any, to zero while enabling the helix to threadedly progress through both nuts as the movable member is adjusted so as to carry the focusing lens, or other mechanism, from one end of its range to the other without change in focus.

BRIEF DESCRIPTION OF THE DRAWINGS

FIG. 1 is a side elevational view of the apparatus of the present invention with portions in dotted outline to illustrate the use of the invention;

FIG. 2 is an enlarged sectional view of apparatus embodying the invention in assembled condition;

FIG. 3 is a top plan view of the apparatus of FIG. 1 demonstrating the means for captivating one of the concentric nut members used with the device;

FIG. 4 is a greatly enlarged top plan view of one of the concentric nut members of the present invention; and FIG. 5 is a view along the line 5—5 of FIG. 3.

DESCRIPTION OF A PREFERRED EMBODIMENT OF THE INVENTION

As a practical matter, backlash free movement or operation of cooperating parts of mechanical apparatus is most desirable. Not the least of which advantages include that of reduced wear, more efficient operation and accurate adjustment and/or placement or positioning of parts; where interrelated motion is critical as in photography and optical character recognition i.e., item/document reading, as employed in modern data processing apparatus.

Prior art devices have been employed wherein one of a pair of concentric nut-like members is captivated by a locking plate, as the plate is rotated, the helix of the adjusting or lead screw forces one concentric member away from a second concentric member, the latter being captivated by a carriage. As both nuts are assembled to the helix or screw they may be forced into any desired position of clearance. Such apparatus as this is not only costly to produce but can and often does require readjustment as the parts wear.

The present invention functions in a somewhat similar manner to the foregoing but due to the novel construction and implementation the present invention is much less costly and does not require any readjustment. It is simple to assemble and is positive in operation.

The present invention is illustrated, for purposes of explanation only, in operable association with an OCR (Optical Character Recognition) matrix height adjusting apparatus.

As seen most clearly with reference to FIG. 1, the present invention is illustrated in conjunction with a scan height adjusting apparatus as employed with a Burroughs Corporation B 3000 Item/Document Reader Sorter. However, it is to be noted that the drawing is merely illustrative of an environment wherein backlash prevention is required and is not to be interpreted as a limiting factor in the employment of the present invention.

A carriage 10, which in the reader/sorter apparatus (not shown) above referred to, supports the optical apparatus used to pick-up information data from the item/document is adapted for sliding movement along a vertically oriented helical member 12. The helix 12 is rotatably supported top and bottom in bearing members 14 permitting the helix to be rotated about its own center by means of an micrometer adjusting knob 16. The carriage is thus positionable vertically up and down adjacent to the document reading area of the apparatus and in close proximity thereto. A pickup lens (not shown) housed in the lens cavity 19 focuses the data from a document such as a check onto an electronic sensor 18 carried by a rear portion of the carriage. Preferably, the electronic sensor 18 comprises an array or matrix of charge coupled devices.

The OCR information carried by the document which is a check or remittance item may be positioned in various locations on the document. In order to read the information, the document traverses the lens cavity 19 and associated electronic pickup 18 of an optical reader in a vertical on edge position. Consequently, the lens cavity 19 and associated electronic pickup 18 must be positioned vertically to be aligned with the information on the document.

The threaded helical member 12 is provided with a star shaped arrangement of lands 24 which are milled or otherwise formed or cut into the central shaft of the helix and which as can be seen from the top plan view of FIG. 4, enables the helix 12 to threadedly, rotatably engage a concentric nut-like member 22, each of the lands or threads 20 of the helix 12 being received in a respective one of the spirally formed or cut grooves 24 of member 22. The fit, tolerance, gap or space between each land and its respective groove is such that without more restraint the nut member 22 would spin, or turn over the helix with little or no outside effort. The periphery of the nut member 22 is provided with, for example, five recesses, or notches 26 extending vertically, some distance into the body of the member 22, as seen most clearly in FIG. 2. Notches 26 are offset from spiral grooves 24 a slight distance as seen in FIG. 4. The two concentric nut-like members 22 (FIG. 2) are substantially identical in construction and configuration so that either can be substituted for the other for purposes which will become more clear as the present description proceeds.

Disposed intermediate the two concentric members is a relatively stiff multi coil torsion spring 28, FIG. 2 having its respective end portions 30 bent away from each other and parallel to each other as seen most clearly in the assembly view of FIG. 2. Each opposite end of spring 28 is receivable in one of the vertically cut notches in oppositely disposed concentric nut members 22 as shown most clearly in FIG. 2.

As earlier pointed out herein, the concentric members 22 are rotatable along the helical lands of member 12 and as also pointed out without further restraint would rotate along the lands of member 12. In order to prevent rotation of the concentric members 22 the hollow cylindrical portion of the support member 10 is provided with a plurality of projecting tangs 32 as seen most clearly in the top plan view of FIG. 3. Each of the tangs projects outwardly into the cylindrical bore opening 34 of member 10 a slight distance and provides a means for restraining one of the two concentric members 22 when such member is introduced into the bore opening 34 for purposes which will be explained presently. The upper and lower rear edge portion of member 10 is provided with a slight notch or recess 36 as seen in FIGS. 3 and 5. The recess portion 36 enables the U-shaped retainer member 38, as shown most clearly in FIGS. 1 and 2, to be received over the opposite ends of the cylindrical portion of member 10 acting in the nature of a retainer or restraint against the dislodgement or accidental removal of the concentric members 22 and the coiled spring 28.

The front portion of the recess 36 is slightly beveled as shown at 40 to enable the easy attachment of the retaining member 38.

The apparatus incorporating the present invention is assembled by first introducing one of the concentric members 22 into the lower portion of the bore 34 in member 10 so that the recesses therein, of which there are five, will seat on and be received over the tangs 32 leaving one of the notches free and clear. The helical spring is next introduced from the opposite end of the shaft so that its lower most projecting end 30 is received within the fifth opening or notch in the lower most concentric member 22. The second concentric member is now introduced into the bore 34 with the notches therein projecting downwardly so that one of the notches will capture or entrap the opposite extending end portion 30 of the helical spring 28. With the three parts, the two concentric members 22 and the helical spring now located within the bore 34 of member 10, the retainer 38 is snapped over the three parts so as to seat on the upper and lower notched areas 36 of the member 10 with the ring portions 42 concentric with the bore opening 34. Thereafter, the helical member 12 is threadedly engaged with the notches 24 of each of the concentric members and pushed into and through the bore portion 34 of member 10 so that each end of the helix extends beyond opposite sides of the member 10. With the helical member threaded in a clockwise direction and with both ends extending from opposite sides of the member 10, the member 10 is then rigidly fixed into position.

Without recourse to the present invention, with the helical member threaded in a clockwise direction, and with both ends extending from opposite sides of the member 10, member 10 can move along the axis of helix 10 to the extent that design, manufacturing, wear, and other clearances between surfaces of helices 20 and grooves 24 permit. Movement is also possible due to clearance space between the end surfaces of nut-like members 22 and retainer 38. Assembled in the manner thus described would result in backlash, or free play, and for an optical, or other precision, positioning device, would be unacceptable.

The present invention solves these problems in a unique manner. The helical member 12 is threaded in a clockwise direction through the upper rotatable nut member 22 and its axial advance stopped just short of engagement with lower fixed nut member 22. While the axial position of helical member 12 is maintained, upper rotatable nut member 22, and the engaged tang 30 of torsion spring 28 are rotated clockwise in the amount of 1 or more threaded leads. The torsion spring reaction urges the grooves 24 of the upper rotatable nut member 22 into intimate contact with the helix 20 of helical member 12 and further urges the outer surface of upper nut member 22 into intimate contact with the inner surface of retainer 38. Helical member 12 is also urged towards rotation in a counter-clockwise direction. With the torsion spring so wound, helical member 12 is threaded in a clockwise direction into engagement with and through lower fixed nut member 22. When the required installing torque is removed, helical member 12 will rotate, however slightly, counter clockwise until there is intimate contact between groove 24 of lower fixed nut member 22 and helix 20 of helical member 12. Since the lower fixed nut member 22 is keyed against rotation by tangs 32 in grooves 26, the lower fixed nut member 22 will be urged axially into intimate contact with the inside surface of retainer 38.

A components position and force equilibrium will be achieved such that all clearances which could result in backlash have been eliminated and a residual torsion spring force remains to accommodate changes which may occur due to enviroment, use, or wear. This effectively eliminates any backlash that may have resulted from the fabrication of the device. Thus, there has been provided a substantially backlash-free, concentrically movable member which can be adapted for a wide variety of operative apparatus.

What is claimed is:

1. Backlash free adjusting apparatus comprising,
   a helical shaft having a spiral thread extending from end to end thereof,
   carrier support means disposed on said shaft for movement along said shaft,
   oppositely disposed concentric members threadedly engaging said helical shaft and slideable there along,
   spring means interposed between said concentric members and captivated by said concentric members so as to prevent rotation thereof, and
   means in said support means for restraining one of said concentric members against rotation while the opposite member is permitted to rotate effective upon rotation of said helical shaft to force the two concentric members apart thereby closing the gaps between the threads of the helical shaft and the concentric members effectively eliminating any backlash in the apparatus.

2. The invention in accordance with claim 1 wherein said helical shaft is provided with at least two helices extending from end to end thereof.

3. The invention in accordance with claim 1 wherein said concentric members each are provided with a spiral thread corresponding in angular offset to one of said helices.

4. The invention in accordance with claim 1 wherein said support member includes oppositely disposed peripheral notches and wherein means is provided receivable within said notches effective to retain said spring and said concentric members within said support means.

5. The invention in accordance with claim 1 wherein said helical shaft is provided with five helicies and wherein each of said concentric members is provided with five helical grooves mating with said helicies.

6. The invention in accordance with claim 1 wherein each concentric member includes a plurality of peripheral recesses extending axially thereof and positioned intermediate the spiral thread.

7. The invention in accordance with claim 6 wherein said support means is provided with an axial bore having a plurality of projections extending inwardly therefrom and of a number one less than the number of peripheral recesses on said concentric members.

8. The invention in accordance with claim 6 wherein said support means is provided with four circularly disposed tangs matingly engageable with the peripheral recesses of one of said concentric members effective thereby to prevent rotation of said concentric member.

9. The invention in accordance with claim 1 wherein said spring means is a torsion spring having oppositely disposed offset bent end portions, each one of which is slideably receivable within a respective recess of a respective one of said concentric members effective to restrain said spring against rotation.

10. The invention in accordance with claim 9 wherein the bent ends of said spring are offset from one another by approximately forty five degrees.

* * * * *